Patented July 29, 1924.

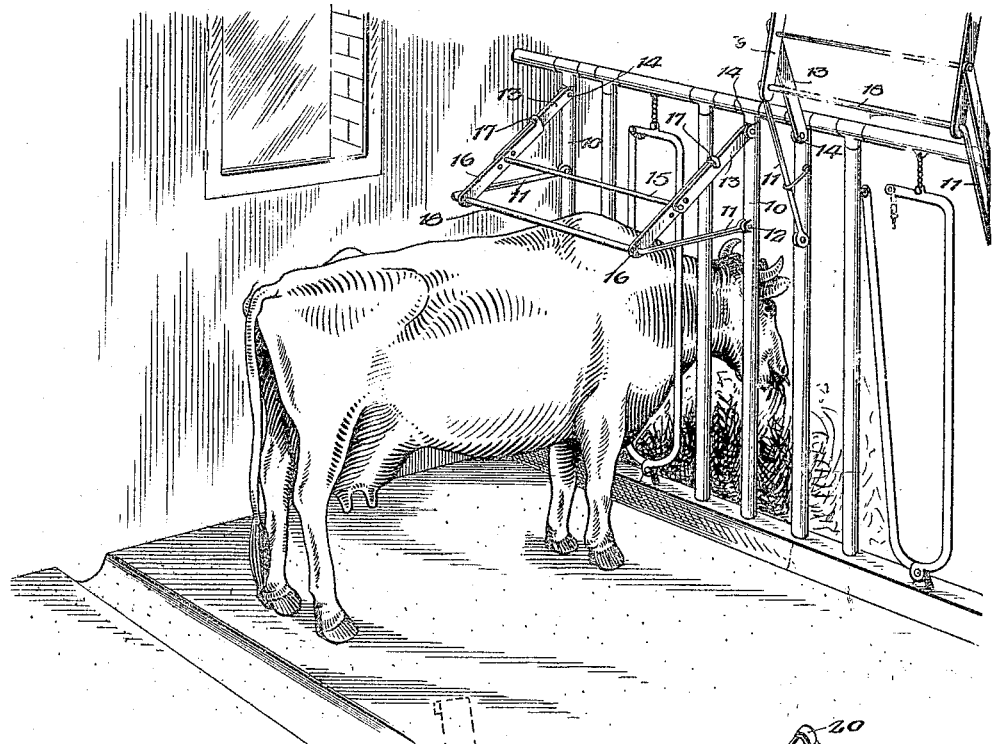

1,503,039

UNITED STATES PATENT OFFICE.

EDWIN J. FRANKLIN, OF KELLOGG, IDAHO.

CLEAN-COW BAR.

Application filed July 18, 1922. Serial No. 575,910.

*To all whom it may concern:*

Be it known that I, EDWIN J. FRANKLIN, a citizen of the United States, residing at Kellogg, in the county of Shoshone and State of Idaho, have invented certain new and useful Improvements in Clean-Cow Bars, of which the following is a specification.

The object of my invention is to provide a simple, economic and effective device for attaching to a cattle stall to prevent the animal from evacuating upon the floor of the stall, and to induce the animal to perform such function in a more sanitary manner.

A further object of my invention is to provide a device especially adapted for use in dairy barns to prevent cows from evacuating in their stalls, while being milked or waiting to be milked.

Another object is to provide a device of this nature which can be easily adjusted so as to effectually operate on cows varying in height, and which can be swung overhead so as not to interfere with the ingress or egress of the cows or their attendants when not in use.

It is commonly known that when a cow is inclined to evacuate that an elevation of the back habitually occurs. This elevation of the back, which appears directly behind the front shoulders, is instinctive and seems necessary in order that the evacuating function may occur. It is, therefore, obvious and has been established in practise that if the arching of the back is prevented the desire to evacuate is suspended.

My invention is adapted to prevent such arching of the back.

Other objects of the invention will readily present themselves to those skilled in the art from the details of construction and operation more fully hereinafter set forth and from the accompanying drawings forming part hereof, in which, Figure 1 is a perspective view showing my device in operative position upon a cow and also showing the manner in which the device is raised so as to be unobstructive when not in use.

Figure 2 shows a portion of a stall structure with a side elevational view of my device secured thereto, the dotted lines illustrating the position of the various parts when raised in inoperative position, and Figure 3 is a perspective view of one of the arms illustrating the locking lugs.

Referring to Figure 1, I have provided for purposes of illustration a conventional type of stall structure having upright supports indicated at 10, it being understood that any stall structure having upright posts or supports defining the stall is suitable for the purpose. I provide a substantially U-shaped member 11 comprising two parallel portions pivotally secured by their ends to the stall, as shown at 12, at about the height of the average cow and a cross member 18 adapted to rest upon the back of the cow.

A pair of spaced parallel arms 13 are also pivotally secured at one end to the upright supports directly above the ends of the member 11, as at 14 and having their opposite ends provided with a series of openings 21 for receiving a rod 15. A second pair of spaced parallel arms 16, is provided having similar openings intermediate their ends thru which the rod 15 also passes, thus linking the two pairs of arms in extended relation. Nuts 19 or other suitable means are threaded on the ends of the rod 15 to prevent the rod from becoming out of engagement with the arms and to maintain the arms in spaced parallel relation.

One end of each of the arms 16 is loosely mounted on the member 18 and the opposite ends are each provided with lugs 17 for engagement with the edges of the adjoining arms 13, thus limiting the movement of the free ends of the arms 16 and to normally maintain the adjoining arms in longitudinal alignment with each other. It will be noticed the lugs are provided with downwardly depending extensions 20 which overlap the edges of the arms 13 and form means for preventing lateral movement of the arms 16 along the rod 15 when the parts are in engaged position. If desired the rod 15 may also be provided with shoulders or similar means abutting the inner edge of the arms 16 so as to prevent movement thereof toward each other.

It will be apparent that when the device is in position with respect to a cow that any tendency to raise the cross member 18 would operate to force the free ends of the arms 16 downwardly and the lugs 17 effectually serve to prevent such movement. Thus the animal is unable to arch its back preliminary to evacuation and is consequently dissuaded from committing such acts in the stall proper, but in order to perform such function must back slightly out of the stall whereupon the matter is deposited in the trough at the rear of the stall provided for that purpose.

It will be noticed that by inserting the rod 15 in the various openings in the arms 13 and 16 that adjustment of the cross member 18 is possible so as to accommodate cows of varying heights.

The device may readily be raised out of contact with the cow by moving the rod 15 upwardly. The ends of the U-shaped member being secured to the stall will act to retard the upward movement of the arms 16 attached thereto and consequently will accelerate the upward movement of the unsecured ends of said arms throwing the lugs 17 out of engagement with the arms 13 and thus permitting the elevation of the cross member 18. The continued elevation of the rod 15, it will be seen, will permit the continued elevation of the cross member 18 to the desired height and if desired a hook or other suitable means may be attached to maintain the device in elevated position when not in use.

I claim:

1. A device of the character described comprising a bar adapted to contact with the back of an animal, parallel arms extending at right angles from said bar and having their ends secured to a stall, a pair of spaced parallel arms mounted at one end on said bar and their opposite ends provided with lugs, a second pair of spaced parallel arms having their one end secured to the stall and their opposite ends provided with a series of openings, similar openings intermediate the ends of the first mentioned spaced parallel arms and a rod insertable thru each of said arms as and for the purposes set forth.

2. In combination with a cattle stall of a substantially U-shaped cow bar secured thereto by its ends and including a cross member adapted to contact with an animal's back, a pair of spaced parallel arms also secured at one end to said stall above the U-shaped bar and their opposite ends provided with openings, a second pair of spaced parallel arms mounted at one end on said cross member and their other ends provided with hook shaped lugs to normally engage the top edges and sides of the first mentioned spaced parallel arms, openings intermediate the ends of the said second mentioned spaced parallel arms, a rod extending thru the openings of all of said spaced parallel arms and means carried by said rod cooperating with said lugs for preventing lateral movement of the arms.

3. In combination with a cattle stall of a substantially U-shaped cow bar secured thereto by its ends and including a cross member adapted to contact with an animal's back, a pair of spaced parallel arms also secured at one end to said stall above the U-shaped bar, a second pair of spaced parallel arms connecting said cross member with the first mentioned spaced parallel arms, a second cross member engaging the respective arms, means carried by said second mentioned spaced parallel arms engaging with said first mentioned spaced parallel arms to normally prevent elevation of said first mentioned cross member.

EDWIN J. FRANKLIN.